Figures 1, 2:
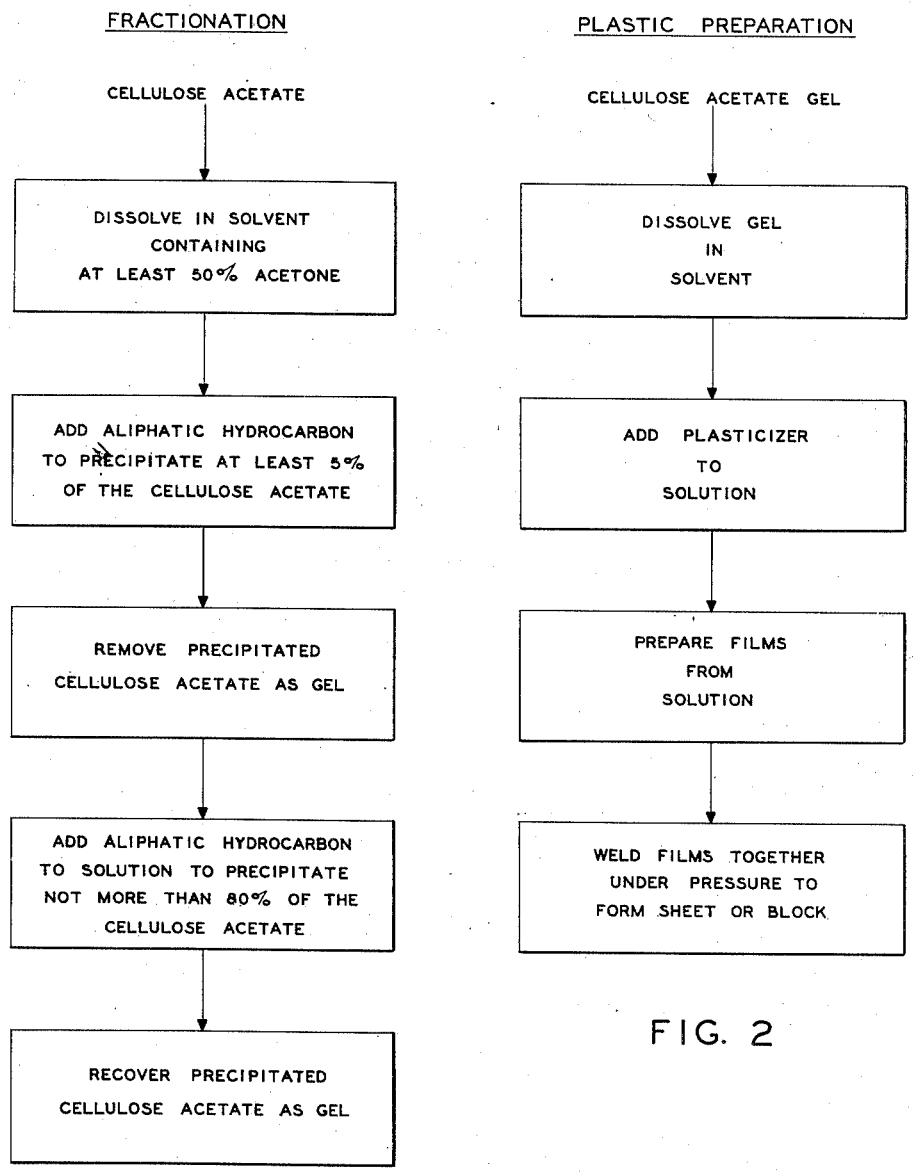

JOSEPH WAYNE KNEISLEY
INVENTOR.

Patented Nov. 22, 1949

2,489,142

UNITED STATES PATENT OFFICE 2,489,142

PROCESS FOR THE PREPARATION OF CELLULOSE ACETATE PLASTIC COMPOSITION

Joseph Wayne Kneisley, New Brunswick, N. J., assignor to Hercules Powder Company, Wilmington, Del., a corporation of Delaware Application November 24, 1945, Serial No. 630,680

8 Claims. (Cl. 260—230)

1

This invention relates to substantially colorless cellulose acetate plastic compositions of optical clarity and to methods for their production. More particularly, it relates to cellulose acetate plastic compositions suitable for use in flexible sheeting for aeronautical use.

There are a variety of applications for substantially colorless, transparent plastic sheeting in the aeronautical field. For example, such sheeting is employed in cockpit canopies, gun turrets, nose sections, windows, etc., in military planes as well as in commercial planes. Aside from the requirement of flexibility in the sheeting so used, there are manifold other specifications which must be met before any plastic will meet with demands of the services and industry in this field.

Up to the present time, there are only two types of plastics which have met with general acceptance in this field, the one type being the acrylate plastics of which polymerized methyl methacrylate is an example, the other being the cellulose acetate plastics. Each type, however, has a particular utility in this field due to its peculiar properties. Thus, the acrylic resins are characterized by having excellent clarity due to the fact that they transmit light freely with substantially no light-scattering. On the other hand, they have poor impact strength at any temperature but particularly so at low temperatures, as at —25° C. Despite these deficiencies, acrylic plastics are employed in sheeting used in combat and transport planes due to the fact that they possess what may be described as "optical clarity."

Cellulose acetate plastics, on the other hand, are employed as window sheeting, enclosures, etc., in military noncombat planes and in commercial planes due to their otherwise more desirable characteristics. The added properties of increased flexibility, higher low temperature and normal temperature impact strength are sufficient to compensate for their lack of optical characteristics; i. e., their lack of freedom from color and lack of "optical clarity," in this application. However, as far as is known, no cellulose acetate plastic has heretofore been produced having such light transmission properties and freedom from light-scattering effects as to be characterized as optically clear and, hence, usable where such clarity is demanded. Nor has it been possible by filtration and the like to produce an acetate of the desired optical color and clarity. It will be apparent, of course, that the attainment of optical clarity and color properties in a cellulose acetate plastic provides a unique and highly advantageous advance.

It has now been found that, contrary to previous beliefs, a cellulose acetate not having the usual characteristic light-scattering and color properties can be prepared. It has been found that cellulose acetate as prepared is not molecularly entirely homogeneous but consists of several colloidal fractions. It now appears that only certain of these fractions have the effect of imparting color and scattering light.

Now, in accordance with this invention, it has been found that cellulose acetate plastics which are substantially colorless and possess optical clarity result from the employment of a new fractionation process as applied to commercial grade cellulose acetate in flake or other form. Broadly, the entire process involves fractionating normal cellulose acetate flake by means of certain solvents and coagulants to obtain an intermediate fraction in the form of a gel, then working up the gel with plasticizer to form a homogeneous, substantially colorless, solid plastic which transmits light freely and is free from haze particles.

The fractionation process itself includes the steps of (a) dissolving cellulose acetate in a solvent comprising at least 50% acetone, (b) adding an aliphatic hydrocarbon of from 3 to 7 carbon atoms as a liquid precipitant or coagulant miscible with the solvent and capable of precipitating the cellulose acetate in gelatinous form, in such an amount as to precipitate at least about 5% of the cellulose acetate originally dissolved but not in an amount to precipitate all or nearly all of the cellulose acetate, (c) after this first precipitate has coagulated in the form of a gel, removing it from the solution, (d) adding additional precipitant to the solution in such an amount as to precipitate not more than about 80% of the cellulose acetate originally dissolved, while at the same time leaving at least about 2% of the cellulose acetate originally dissolved in solution, and (e) after this second precipitate has coagulated in the form of a gel, recovering the same from the solution.

This procedure isolates from the original cellulose acetate a derived acetone-soluble fraction free of color-forming and light-scattering colloidal fractions, such undesired fractions being concentrated in the initial precipitate and in the residual solution. Reference to the attached drawing, Fig. 1, will show the sequence of steps involved in the described fractionation.

According to the preferred mode of procedure in accordance with this invention, upon recovering the second gel fraction as described, it is worked up with added plasticizer into a solid plastic by any one of a number of procedures. These procedures are all characterized by the distinctive fact that the gel is converted to a solid plastic without precipitation of the gelled cellulose acetate into flake form at any subsequent stage.

An illustration of a method of treating the recovered gel fraction is given by the process outlined in Fig. 2 of the drawing. A second gel fraction obtained in step (e) as above-described is dissolved in an organic solvent. A cellulose acetate plasticizer is then added, and films are cast from the resulting solution. These films are then dried at suitable temperatures and welded together under pressure, if desired with the aid of heat or solvents, to form a sheet or block of the desired thickness. The sequence of the steps involved in this particular embodiment may be followed by reference to Fig. 2 of the attached drawing.

The new products resulting from the processes described are particularly colorless cellulose acetate plastic compositions of optical clarity characterized by having the following light transmission properties:

(a) An excitation purity value of less than 6%, and
(b) A visual efficiency greater than 85%.

These are the properties as measured on a ½-inch thick disc of the plastic composition, the disc having been compression molded in a positive mold with stainless steel walls and polished nickel plates for faces under a pressure of 2000 lb./sq. in., and at a temperature of 160° C. for 15 minutes, the method of measurement being that of the International Commission of Illumination of 1931. The new plastic is also characterized by an opacity of below 0.50% as determined using a Pulfrich Nephalometer, using a ½-inch thick disc molded as aforesaid and immersed in water in a glass optical cell.

It will be appreciated that excitation purity has nothing at all to do with purity but is an optical term characterizing the nature of light transmitted by a test specimen. A very low value (such as below 6%) is a fundamental physical characteristic of material having no substantial effect upon the color of light transmitted therethrough; i. e., white light comes through uncolored. The visual efficiency of above 85% is indicative of extreme clarity of the general order of that of glass. No prior cellulose acetate plastic has ever had characteristics approaching those of applicant's product.

Having indicated in a general way the nature of this invention, the following examples are given as illustrative of the preparation of intermediate gel fractions from cellulose acetate in accordance with this invention.

*Example 1*

Seven hundred fifty parts of commercial cellulose acetate (3% moisture) was dissolved in redistilled acetone to form a 5% solution by adding the acetate to the solvent with agitation. The cellulose acetate employed had a combined acetic acid content of 53% and a viscosity of 40 seconds as determined by the Hercules falling ball method. One thousand parts of redistilled n-pentane was added to the solution with agitation. Upon completion of this addition, the solution became cloudy. Four hundred additional parts of redistilled n-pentane was then added and agitation continued for 15 minutes. The mixture was then allowed to stand at 25° C. for 6 hours, at the end of which period a gelatinous precipitate had settled to the bottom of the container, leaving a clear solution of the remaining acetate in the liquor. This liquor was transferred to another container by means of a siphon. Three thousand parts of n-pentane was then slowly added to the liquor with agitation. After a few minutes, a gelatinous precipitate formed. This settled shortly as a stiff gel which was recovered as a second gel fraction by siphoning off the supernatant liquor. Analysis showed that the first gel fraction contained 290 parts of cellulose acetate (40% of the original cellulose acetate). The second gel fraction contained 52.5% of the original cellulose acetate and 7.5% remained in the liquor.

*Example 2*

The process of Example 1 was duplicated, using n-hexane for n-pentane. Analysis of the gel fractions showed that the first fraction contained 40% of the original cellulose acetate, that the second fraction contained 54% of the original cellulose acetate, and that 6% remained in the liquor. The two gel fractions thus obtained were very similar in appearance to those correspondingly obtained in Example 1.

The following example is illustrative of one of the various methods which may be employed for working up the second or intermediate gel into a substantially colorless solid plastic of optical clarity.

*Example 3*

The second gel fraction obtained in Example 1 and containing 382 parts of derived cellulose acetate was stirred into redistilled acetone in a quantity sufficient to bring the cellulose acetate content to 14% by weight. To the resulting solution was added 172 parts of pure dimethyl phthalate with agitation. The resulting solution was poured in small amounts into glass containers having level plane internal bottom surfaces and the solvent allowed to evaporate, the atmosphere being maintained dust-free. The quantity poured in each case was in an amount to give films of 25 mils thickness. The films were stripped from the containers and dried at 60° C. for 16 hours. They were then cut into discs 2 inches in diameter with a stainless steel die, using cellulose acetate block as the cutting base. Thirty-four grams of thin discs were piled on each other and welded together in a Carver press at 160° C. for 15 minutes at 2000 lb./sq. in. pressure to give a disc ½ inch thick. The press was fitted with a positive mold having stainless steel walls and polished nickel plates for faces for this operation. The resulting disc was given a bright polish by dipping in acetone for a few seconds. It was found to have the following optical properties as compared with a disc molded and polished in a similar manner but made from a molding powder prepared from the high grade unfractionated cellulose acetate used as starting material in the above examples and containing dimethyl phthalate as the plasticizer:

| | Example 1 | Comparator |
|---|---|---|
| Brightness (Visual Efficiency)_____per cent__ | 88.4 | 78.5 |
| Dominant Wave Length_____mmu__ | 572.5 | 574 |
| Excitation Purity_____per cent__ | 4.0 | 11.2 |
| Opacity (Pulfrich)_____do____ | 0.20 | 1.30 |
| Trichromatic Coefficients: | | |
| x_____ | 0.3162 | 0.3282 |
| y_____ | 0.3253 | 0.3399 |
| z_____ | 0.3585 | 0.3319 |

A visual comparison of the discs showed that the disc prepared from the gel was colorless and possessed a brilliant transparency or sparkle. Objects viewed through the disc as a lens were well defined and not distorted. The comparator disc, on the other hand, had a yellow cast and did not possess this brilliant transparency. The characteristic haze of all previous "clear" cellulose acetate plastic was present. Objects viewed through the disc used as a lens were ill defined.

The following additional examples, 4 to 9 inclusive, illustrate modifications of the processes of the above examples. Acetone was used as solvent and n-pentane as precipitant. The quantity of the precipitant was varied to cause precipitation of the proportions of cellulose acetate indicated in the table. In all cases, the cellulose acetate used as starting material was the same as that used in Example 1, and the gels obtained were worked up into plastics according to the method of Example 3. Sufficient dimethyl phthalate was employed as plasticizer in each instance to provide a plastic having about 30% plasticizer. The percentage of original cellulose acetate precipitated in each of the two gel fractions are set forth in the accompanying table, with the optical characteristics of the plastics prepared from the corresponding desired gel fraction.

An alternate method for working up a gel fraction produced in accordance with this invention involves adding a cellulose acetate plasticizer directly to the gel and removing volatile components; i. e., the solvent and diluent in the gel itself, by mixing gel and plasticer to form a paste of such a consistency that it can be rolled to remove residual volatile components on a roll mill. The plasticizer combines with the volatile materials in the gel to form a fair solvent for the gel in some cases, or it may exert solvent power as hydrocarbons in the gel are removed by volatilization. The desired plastic when fully colloided and homogeneous may be taken off the roll in the form of a sheet, or it may be taken off as a ribbon and cut into granules of molding powder. If desired, vacuum may be employed during the mixing operation to aid in removing volatile components prior to processing on a roll mill. If desired, the paste resulting from the mixing operation may be extruded hot or cold without further processing to form films, sheets, rods, tubing, or other extrudable shapes. All operations in any manner of handling the desired gel fractions must, of course, be carried out in clean equipment and a dust-free atmosphere.

in. pressure at from 50° to 120° C. Sheets of any desired thickness may be cut from the resulting block. Plastics made from gel fractions by the alternative methods discussed hereinabove have been found to be substantially colorless, to possess brilliant transparency, and to have optical properties similar to those of the product of Example 3.

In accordance with this invention, the cellulose acetate employed in the fractionation process may be in any of the usual forms in which it is available commercially. Thus, it may be in porous flake form, in pulverulent form, or in fibrous form, etc. The cellulose acetate employed is not limited so far as combined acetic acid content is concerned with the exception that it must be soluble in the acetone-containing solvent employed. Thus, in general, the particular cellulose acetate employed will have a combined acetic acid content of from about 50% to about 59%. The viscosity of the cellulose acetate employed is not critical. The usual plastic-type cellulose acetate, however, is preferred; i. e., from about 12 to 120 seconds viscosity, this viscosity characteristic being determined by the time of fall of a $\frac{5}{16}$-inch steel ball through 10 inches of a 20% solution of cellulose acetate in 90 parts acetone : 10 parts ethanol in a 1-inch tube at 25° C.

The solvent employed for the fractionation will be one which dissolves the cellulose acetate employed and which contains, as the essential active element, acetone to the extent of at least 50% by weight of the solvent. Thus, acetone, acetone-lower ketone mixtures, acetone-lower aliphatic alcohol mixtures, or acetone mixtures containing lower aliphatic alcohol esters of lower fatty acids, such as methyl acetate, ethyl acetate, ethyl formate, etc., may be used. In the case of acetone-lower ketone mixtures, any ketone of 6 carbon atoms and under, as methyl ethyl ketone, methyl isopropyl ketone, or methyl isobutyl ketone, etc., may be utilized. Where acetone-lower aliphatic alcohols are employed, alcohols of 4 carbon atoms and under, as methyl, ethyl, propyl, butyl, etc., alcohols may be used. Preferably, the solvents employed will be freed of any possible contaminants prior to use. The concentration of the solution prepared may vary considerably, for example, between 1% and 15%, depending upon the type of cellulose acetate employed. Practical considerations, such as the time involved in pre-

*Table*

| Example | Cellulose Acetate [1] Removed Initially | Cellulose Acetate In Desired Gel Fraction | Pulfrich Opacity | Brightness | Dominant Wave Length | Excitation Purity |
|---|---|---|---|---|---|---|
| | Per cent | Per cent | Per cent | Per cent | Mmu | Per cent |
| 4 | 77 | 15 | 0.20 | 88.7 | 572 | 3.7 |
| 5 | 36 | 55 | 0.20 | 88.4 | 572.5 | 4.0 |
| 6 | 50 | 44 | 0.24 | 88.7 | 572.5 | 4.3 |
| 7 | 38 | 39 | 0.21 | 89.1 | 573 | 4.7 |
| 8 | 23 | 75 | 0.30 | 88.1 | 573 | 4.8 |
| 9 | 37.5 | 23 | 0.18 | 87.9 | 571 | 5.0 |

[1] Represents the total amount of cellulose acetate removed by precipitation from the original solution prior to precipitating the gel fraction which was used to make the plastic.

An additional alternative method in working up the gels of this invention involves taking the sheets resulting from processing on a roll mill and welding the same together to form a block of substantially greater thickness than that of a single sheet by pressing at from 100 to 6000 lb./sq.

cipitation, will usually control. In general, a solution containing from about 3% to about 7% cellulose acetate is employed for most convenient operation.

Having prepared a suitable cellulose acetate solution as described, an aliphatic hydrocarbon of from 3 to 7 carbon atoms is added to the solution in controlled amount. The amount to be employed will be such as to effect the precipitation of at least about 5% of the cellulose acetate originally dissolved. This constitutes the critical minimum limit of the amount of cellulose acetate to be precipitated initially in order to obtain ultimate plastics substantially colorless and of optical clarity. Plastics of optimum clarity result from the precipitation of at least about 15% of the cellulose acetate, say from 15% to 60%, in this first fraction. However, the hydrocarbon precipitant will be added in an amount less than that which precipitates all or nearly all of the cellulose acetate in solution since the desired product must remain in solution at this stage. Thus, the hydrocarbon will be added in an amount less than sufficient to bring about precipitation of 80% or more of the cellulose acetate present.

It has been found that, although there are a very large number of substances which can precipitate cellulose acetate from acetone solutions, only certain precipitants, for reasons unknown, permit practical recovery of fractions capable of forming optically clear plastics. Thus, such precipitants as water and alcohol are not adapted for the process possibly because their oxygen-containing groups either affect the acetate precipitated or because the oxygen groups prevent coaction with acetone to give selective fractionation.

The precipitants to be employed in accordance with this invention are the aliphatic hydrocarbons of from 3 to 7 carbon atoms, as propane, n-butane, isobutane, n-pentane, isopentane, tetramethylmethane, n-hexane, ethyl isobutane, diisopropane, trimethylethylmethane, n-heptane, cyclopentane, cyclohexane, cycloheptane, etc., and mixtures thereof, such as petroleum ether, naphtha, commercial hexane, etc., with n-pentane, n-hexane, and petroleum ether being preferred. It will be understood that the particular precipitant employed must be completely miscible with the cellulose acetate solvent employed or sufficiently miscible to provide homogeneous solutions when the amounts of precipitant required in accordance with this invention are added. Precipitation must be carried out under pressure where propane and the butanes are used to maintain the precipitant in the liquid state, and, while this has some disadvantages, it permits separation of the precipitant from the various resulting fractions merely by release of pressure. It will be apparent further that the actual precipitating liquid employed may be one of the precipitants mentioned, diluted partially with the cellulose acetate solvent previously employed.

As illustrated in Example 1, the precipitant is preferably added with agitation of the cellulose acetate solution. As the precipitant is added, the solution becomes very cloudy. When agitation is stopped and the mixture allowed to stand, what appears to be a precipitate of opaque solid particles settles and coalesces to form a more or less uniform gel. It generally takes from ½ to 8 hours for this first gel fraction to settle out. The time involved will vary, depending upon the viscosity of the mixture and the amount of the precipitate. After the precipitate has coagulated, it may be removed by decantation, siphoning, centrifuging, or the like.

A second gel fraction is then precipitated by adding sufficient additional precipitant with agitation of the solution to precipitate a quantity not more than about 80% of the cellulose acetate originally dissolved, preferably not more than about 75%. Care must be taken at this point that too much of the cellulose acetate in the solution is not precipitated. It is essential that only such amounts of cellulose acetate be precipitated as to insure that there remains in solution at least about 2%, and preferably about 5%, of the cellulose acetate originally dissolved. As first precipitated, the desired material separates out in suspended flocculent particles. These particles, however, coalesce to form a homogeneous, more or less translucent gel. Analysis of this second gel where an acetone-(n-pentane) system is employed will generally fall within the following limits:

|  | Per cent |
|---|---|
| Cellulose acetate | 25 to 45 |
| Acetone | 50 to 70 |
| n-Pentane | 5 to 10 |

The second gel fraction may be recovered in any desired manner, as, for example, by siphoning off the mother liquor.

For practical purposes, it is sufficient to separate the cellulose acetate employed as starting material into three fractions; namely, a first fraction which is entirely unsatisfactory for preparing clear plastics, a second fraction from which colorless plastics of optical clarity are prepared, and a final or residual fraction which remains dissolved after removal of the first two fractions. However, if desired, additional intermediate fractions can be obtained by controlling the amount of precipitant added, and it will be appreciated that any one or any combination of the intermediate fractions (after elimination of the first 5% or more) will produce plastics of optical clarity. The operable and preferred ranges for the separation of the original cellulose acetate into fractions are as follows:

| | Operable | Preferred |
|---|---|---|
| First Fraction | At least 5% | At least 15%. |
| Second Fraction or Total of Intermediate Fractions. | Not more than 80%. | Not more than 75%. |
| Residual Fraction | At least 2% | At least 5%. |

The first fraction can be precipitated in portions, if desired. In such case, the term "first fraction" will be inclusive of portions totaling not less than 5% of the original cellulose acetate, separated prior to precipitation of the desired fraction capable of optically clear product formation, and the term "second fraction" will refer to desired product precipitated after previous removal of at least 5% of the original cellulose acetate.

The second fraction, or other intermediate fraction, in all cases is the desired product capable of forming optically clear and colorless cellulose acetate articles. The first gel fraction yields cellulose acetate suitable only where clarity is not required. The residual fraction remaining in solution can be recovered by precipitation therefrom or evaporation for use where poor color and lowered stability are acceptable.

The process of Example 3 is illustrative of one method which may be used in working up the gel fractions obtained in accordance with this invention into plastic masses. The desired gel fraction is dissolved in sufficient solvent to give a solution containing from about 10% to about 25% cellulose acetate. This concentration range is not critical but merely illustrative. Any solvent for the gel may be employed; however, it is desirable to employ the solvent used in dissolving the original cellulose acetate. The resulting solution is mixed with a cellulose acetate plasticizer which itself is substantially colorless and uncontaminated with foreign matter. The amount of plasticizer to employ will depend upon the physical and other characteristics desired in the resulting plastic, usually from about 5% to about 40% plasticizer will be employed, based on the total nonvolatile ingredients.

Thus, for example, dimethyl phthalate, diethyl phthalate, dimethoxyethyl phthalate, methyl phthalyl ethyl glycolate, ethyl phthalyl ethyl glycolate, p-toluene sulfonamid, tributyl phosphate, dibutyl tartrate, diamyl tartrate, triacetin, tripropionin, diethylene glycol dipropionate, and combinations thereof may be employed. It is preferred that the plasticizer used have a high refractive index.

The products resulting from the practice of the processes described herein are substantially colorless plastics of optical clarity and are characteristic in that they have certain definite light transmission properties. They have an excitation purity less than 6% and a visual efficiency greater than 85%. As pointed out by the examples, the excitation purity of the plastics prepared in accordance with the invention has been found generally to fall within the range of 6% to 3%, whereas the visual efficiency of the plastics has been found generally to fall within the range of 85% to 90%. These plastics are additionally characterized by an opacity of below 0.50% as determined by use of a Pulfrich Nephalometer. These measurements are on the basis of a ½-inch thick disc of the plastic composition which for test purposes suitably consists of 67% cellulose acetate and 33% dimethyl phthalate, which disc has been compression molded in a positive mold with stainless steel walls and polished nickel plates for the faces under a pressure of 2000 lb./sq. in. and at a temperature of 160° C. for 15 minutes.

It is possible to recover a derived cellulose acetate fraction in granular or flake form by mixing the gelatinous mass or gel fraction obtained subsequent to removal of an initial precipitate of at least 5% of the cellulose acetate, as hereinbefore described, with a cellulose acetate solvent miscible therewith and with water, the solvent preferably being acetone, to form a solution. The solvent is added in an amount to bring the derived cellulose acetate content to below 25%, preferably to 15%–20%. Water is then stirred into the solution in an amount to precipitate the derived cellulose acetate, which is then removed, washed with water, and dried, preferably at 60°–90° C. under vacuum. The resulting flake can be converted to plastic compositions characterized by an excitation purity value of 3% to 6% and a visual efficiency value of 82% to 88% when sufficient care is taken to use absolutely clean equipment and pure additives.

The light transmission characteristics of the plastics resulting from the application of the methods described herein were determined by obtaining a spectral transmission curve of discs prepared by the standard procedure described above, under illumination at normal incidence on a spectrophotometer, and then analyzing the curve so obtained by using the normal color mixture data for the standard observer and the spectral energy distribution of illuminant C, as defined in 1931 by the International Commission on Illumination, hereinafter referred to as I. C. I.

The method as set up by the I. C. I. is based upon the fact that any color can be matched by the additive mixture of three arbitrarily chosen primary colors. The amounts of the three primaries required to match the sample color are known as the X, Y, and Z tristimulus values. Three other quantities, $x$, $y$, and $z$, known as trichromatic coefficients, are defined as follows:

$$x = \frac{X}{X+Y+Z} \quad y = \frac{Y}{X+Y+Z} \quad z = \frac{Z}{X+Y+Z}$$

Since the sum of the three trichromatic coefficients is equal to 1, it follows that any two of these coefficients define a given color, the third being merely the difference between 1 and the sum of the other two.

The trichromatic coefficients of a disc may be readily calculated from the spectrophotometer transmission curve given by the disc. While the $x$ and $y$ trichromatic coefficients, for example, define the results of a color measurement for the purpose of color tolerance specification, it is more convenient to express these in terms of a dominant wave length and excitation purity. These two attributes of color; that is, dominant wave length and excitation purity are merely a polar coordinate form of the $x$ and $y$ trichromatic coefficients and uniquely define colors of the same brightnesses. Having determined the $x$ and $y$ trichromatic coefficients of a cellulose acetate disc, the dominant wave length and excitation purity of the disc may be determined by plotting the $y$ value as ordinate and the $x$ value as abcissa on a two-dimensional diagram. When this point is connected by a straight line passing through the point represented by illuminant C (a standard illuminant defined by the I. C. I. and which approximates average normal daylight), the line will intersect the locus of points representing the pure spectrum colors at a point whose wave length is known as the dominant wave length of the sample. The ratio of the distance between illuminant point and sample point to the total distance between illuminant point and spectrum locus, expressed in per cent, is known as the excitation purity. In this manner, two attributes of color of a sample; i. e., dominant wave length and excitation purity, are accurately defined. It is convenient to reach an understanding of these two attributes of color to look upon the dominant wave length as defining the hue of a given sample and to regard excitation purity as defining the saturation of color in a given sample. It will be understood that a high excitation purity of a sample indicates a high concentration in the transmitted light of the particular wave length transmitted by that sample, whereas a low excitation purity indicates a low concentration in the transmitted light of the particular wave length transmitted by that sample. In the case of the present invention, the excitation purity value is so low that there is substantially no hue to the sample. In this circumstance, the dominant wave length is not critical in describing the nature of the test piece.

A third attribute of color of a sample is the brightness or, more accurately, the visual efficiency. It is measured by the Y tristimulus value. The visual efficiency of any given sample may be computed by determining the Y value for a surface having a reflection factor of 1.000 at all wave lengths. The ratio of the Y value of the sample to the Y value of this perfect reflector is the visual efficiency of the sample. In other words, it is the brightness of the sample relative to the brightness of a perfect reflector under the same illumination—in the present case, illuminant C.

Charts for facilitating the conversion of the trichromatic coefficients into dominant wave length and excitation purity and manner of determining brightness, as well as complete exposition of the method set up by the I. C. I., may be found in the Handbook of Colorimetry, the Technology Press, Massachusetts Institute of Technology, Cambridge, Massachusetts, 1936, prepared under the direction of Arthur C. Hardy.

The Pulfrich opacity values of the plastics of this invention were determined by use of the Pulfrich Nephalometer, using a ½-inch thick disc immersed in a glass optical cell. The operation of this device is described in Laboratory Apparatus and Reagents (1931), A. H. Thomas Co., pages 613 to 619.

The products of this invention are of particular utility in the aeronautical industry. Cellulose acetate plastics prepared as described may be employed as sheeting for the manufacture of shaped enclosures for use on all aircraft where a plastic of superior clarity is required. A manufacturer may now equip his planes with plastics which have, at the same time, optimum clarity, true colorlessness, and high impact strength at normal and low temperatures. As a specific example, plastics can be prepared in accordance with this invention to meet the optical requirements of grade A of the "Navy Aeronautical Specification" P-41c, as amended February 22, 1943, for plastic, transparent, flame-resisting sheet. Heretofore, cellulose acetate plastics have not had the clarity required to meet this specification. The superiority of these plastics for other applications in the aeronautical and other fields, as for instrument dials and crystals, navigating instruments, insulation, structural parts, etc., is obvious.

The major advantage accruing with the use of the cellulose acetate plastics of this invention lies in the attainment of colorless crystal clarity. These plastics are substantially free from color, as is apparent from their light transmission characteristics. The attainment of crystal or optical clarity in a plastic which has at the same time high impact strength at normal and subnormal temperatures constitutes an advance in the plastics art which is of far-reaching significance.

It also has been found that plastics based on the derived cellulose acetate fraction obtained in accordance with this invention have a materially higher impact strength than do plastics made from the original cellulose acetate used as the raw material. Apparently, the colloidal fractions which impart color and are responsible for scattering of light have an undesirable effect on impact strength.

Wherever, in the specification and claims, a solution is mentioned, the term is to be considered of sufficient breadth to include a homogeneous mixture which technically may be considered a colloidal dispersion, as well as true solutions.

Wherever, in the specification and claims, the term "aliphatic hydrocarbon" appears, it is used in the sense of including cycloaliphatic hydrocarbons.

All parts and percentage figures in this specification and appended claims are by weight unless otherwise indicated.

The Hercules falling ball method of viscosity determination, as used herein, refers to the method wherein the time of fall in seconds of a $\frac{5}{16}$-inch steel ball through 10 inches of a 20% solution of cellulose acetate in 90 parts of acetone : 10 parts of ethyl alcohol in a 1-inch tube at 25° C. is measured.

What I claim and desire to protect by Letters Patent is:

1. A fractionation process for the preparation of a cellulose acetate material productive of substantially colorless plastics of optical clarity which comprises dissolving cellulose acetate in a solvent of the group consisting of acetone and mixtures of acetone with at least one organic liquid of the group consisting of lower aliphatic alcohols, lower aliphatic ketones, and lower aliphatic alcohol esters of the lower fatty acids, said mixtures containing at least 50% by weight of acetone; adding a saturated aliphatic hydrocarbon of from 3 to 7 carbon atoms, miscible with said solvent and capable of precipitating the cellulose acetate in gelatinous form, in such an amount as to precipitate at least about 5% and less than all of the cellulose acetate originally dissolved; removing the precipitate formed thereby from the solution; adding additional hydrocarbon precipitant to the remaining cellulose acetate solution in such an amount as to precipitate therefrom not more than about 80% of the cellulose acetate originally dissolved while at the same time leaving at least about 2% of the cellulose acetate originally dissolved in solution; and recovering the resulting precipitate from the solution.

2. A fractionation process for the preparation of cellulose acetate material productive of substantially colorless plastics of optical clarity which comprises dissolving cellulose acetate in a solvent of the group consisting of acetone and mixtures of acetone with at least one organic liquid of the group consisting of lower aliphatic alcohols, lower aliphatic ketones, and lower aliphatic alcohol esters of the lower fatty acids, said mixtures containing at least 50% by weight of acetone; adding a saturated aliphatic hydrocarbon of from 3 to 7 carbon atoms, miscible with said solvent and capable of precipitating the cellulose acetate in gelatinous form, in such an amount as to precipitate at least about 15% and less than 80% of the cellulose acetate originally dissolved; removing the precipitate formed thereby from the solution; adding additional hydrocarbon precipitant to the remaining cellulose acetate solution in such an amount as to precipitate therefrom not more than about 75% of the cellulose acetate originally dissolved while at the same time leaving at least about 5% of the cellulose acetate originally dissolved in solution; and recovering the resulting precipitate from the solution.

3. A fractionation process for the preparation of cellulose acetate gels productive of substantially colorless plastics of optical clarity which comprises dissolving cellulose acetate in a solvent of the group consisting of acetone and mixtures of acetone with at least one organic liquid of the group consisting of lower aliphatic alcohols, lower aliphatic ketones, and lower aliphatic alcohol esters of the lower fatty acids, said mixtures containing at least 50% by weight of acetone; adding a saturated aliphatic hydrocarbon of from 3 to 7 carbon atoms, miscible with said solvent and capable of precipitating the cellulose acetate in gelatinous form, in such an amount as to precipitate at least about 5% and less than all of the cellulose acetate originally dissolved; after allowing the resulting first precipitate to coagulate and settle for a period of from about ½ to about 8 hours, removing it from the solution; adding additional hydrocarbon precipitant to the remaining cellulose acetate solution in such an amount as to precipitate therefrom not more than about 80% of the cellulose acetate originally dissolved while at the same time leaving at least about 2% of the cellulose acetate originally dissolved in solution; and after the resulting second precipitate has formed a gelatinous mass, recovering the same from the solution.

4. A fractionation process for the preparation of cellulose acetate gels productive of substantially colorless plastics of optical clarity which comprises dissolving cellulose acetate in a solvent of the group consisting of acetone and mixtures of acetone with at least one organic liquid of the group consisting of lower aliphatic alcohols, lower aliphatic ketones, and lower aliphatic alcohol esters of the lower fatty acids, said mixtures containing at least 50% by weight of acetone; adding pentane in such an amount as to precipitate at least about 5% and less than all of the cellulose acetate originally dissolved; after the resulting first precipitate has formed, removing it from the solution; adding additional pentane to the remaining cellulose acetate solution in such an amount as to precipitate therefrom not more than about 80% of the cellulose acetate originally dissolved while at the same time leaving at least about 2% of the cellulose acetate originally dissolved in solution; and after the resulting second precipitate has formed a gelatinous mass, recovering the same from the solution.

5. A fractionation process for the preparation of cellulose acetate gels productive of substantially colorless plastics of optical clarity which comprises dissolving cellulose acetate in a solvent of the group consisting of acetone and mixtures of acetone with at least one organic liquid of the group consisting of lower aliphatic alcohols, lower aliphatic ketones, and lower aliphatic alcohol esters of the lower fatty acids, said mixtures containing at least 50% by weight of acetone; adding hexane in such an amount as to precipitate at least about 5% and less than all of the cellulose acetate originally dissolved; after the resulting first precipitate has formed, removing it from the solution; adding additional hexane to the remaining cellulose acetate solution in such an amount as to precipitate therefrom not more than about 80% of the cellulose acetate originally dissolved while at the same time leaving at least about 2% of the cellulose acetate originally dissolved in solution; and after the resulting second precipitate has formed a gelatinous mass, recovering the same from the solution.

6. A fractionation process for the preparation of cellulose acetate gels productive of substantially colorless plastics of optical clarity which comprises dissolving cellulose acetate in a solvent comprising methyl ethyl ketone and at least 50% acetone; adding a saturated aliphatic hydrocarbon of from 3 to 7 carbon atoms, miscible with said solvent and capable of precipitating the cellulose acetate in gelatinous form, in such an amount as to precipitate at least about 5% and less than all of the cellulose acetate originally dissolved; after the resulting first precipitate has formed, removing it from the solution; adding additional hydrocarbon precipitant to the remaining cellulose acetate solution in such an amount as to precipitate therefrom not more than about 80% of the cellulose acetate originally dissolved while at the same time leaving at least about 2% of the cellulose acetate originally dissolved in solution; and after the resulting second precipitate has formed a gelatinous mass, recovering the same from the solution.

7. A fractionation process for the preparation of cellulose acetate gels productive of substantially colorless plastics of optical clarity which comprises dissolving cellulose acetate in acetone; adding a saturated aliphatic hydrocarbon of from 3 to 7 carbon atoms, miscible with said solvent and capable of precipitating the cellulose acetate in gelatinous form, in such an amount as to precipitate at least about 5% and less than all of the cellulose acetate originally dissolved; after the resulting first precipitate has formed, removing the same from the solution; adding additional hydrocarbon precipitant to the remaining cellulose acetate solution in such an amount as to precipitate therefrom not more than about 80% of the cellulose acetate originally dissolved while at the same time leaving at least about 2% of the cellulose acetate originally dissolved in solution; and recovering the resulting gel precipitate from the solution.

8. A fractionation process for the preparation of a cellulose acetate material productive of substantially colorless plastics of optical clarity which comprises dissolving cellulose acetate in a solvent of the group consisting of acetone and mixtures of acetone with at least one organic liquid of the group consisting of lower aliphatic alcohols, lower aliphatic ketones, and lower aliphatic alcohol esters of the lower fatty acids, said mixtures containing at least 50% by weight of acetone; adding a saturated aliphatic hydrocarbon of from 3 to 7 carbon atoms, miscible with said solvent and capable of precipitating a cellulose acetate in gelatinous form, in such an amount as to precipitate not less than about 5% and not more than about slightly under 80% of the cellulose acetate originally dissolved; removing the precipitate formed thereby from the solution; adding additional hydrocarbon precipitant to the remaining cellulose acetate solution in such quantity as to precipitate therefrom an amount of cellulose acetate not in excess of 80% of the cellulose acetate originally dissolved, the total amount of cellulose acetate precipitated being not more than 98% of that originally dissolved; and recovering the resulting precipitate from the solution.

JOSEPH WAYNE KNEISLEY.

REFERENCES CITED

The following references are of record in the file of this patent:

UNITED STATES PATENTS

| Number | Name | Date |
| --- | --- | --- |
| 1,842,640 | Zimmerli | Jan. 26, 1932 |
| 2,024,666 | Staudt et al. | Dec. 17, 1935 |
| 2,048,686 | Conklin | July 28, 1936 |
| 2,319,040 | Conklin | May 11, 1943 |

FOREIGN PATENTS

| Number | Country | Date |
| --- | --- | --- |
| 741,220 | France | Feb. 8, 1933 |

(Other references on following page)

OTHER REFERENCES

Herzog et al.: "Cellulosechemie," vol. 13, 1932, pages 25–31.
Ohl: Kunstseide, vol. 12, 1930, pages 468–472.
Morey et al.: J. Phys. Chem., vol. 50, January 1946, pages 12–22. Copy in U. S. Patent Office Scientific Library.
Ind. and Eng. Chem., vol. 30, 538 to 543 (1938).
Sookne: Natl. Bur. Stds. Jour. of Research, vol. 29; 123 to 130 (1942).
McNally et al.: "The Fractional Precipitation of Cellulose Acetate," J. A. C. S. 1929, pp. 3095–3101. 260/230.
Mardles: "Study of the Solvents of Some Cellulose Esters," Journal of Society of Chemical Industry, Mar. 29, 1923, vol. XLII, No. 13, pp 127–136. 18/54 E.